United States Patent [19]

Finkelstein et al.

[11] Patent Number: 4,509,094
[45] Date of Patent: Apr. 2, 1985

[54] ELECTROLYTIC CAPACITOR FOR AT LEAST 150 V SERVICE

[75] Inventors: Manuel Finkelstein, North Adams; Sidney D. Ross, Williamstown, both of Mass.

[73] Assignee: Sprague Electric Company, North Adams, Mass.

[21] Appl. No.: 581,757

[22] Filed: Feb. 21, 1984

[51] Int. Cl.³ .............................................. H01G 4/22
[52] U.S. Cl. ................... 361/314; 252/62.2; 252/567
[58] Field of Search .............. 361/311–315, 361/433; 252/62.2, 567

[56] References Cited

U.S. PATENT DOCUMENTS 3,487,270 12/1969 Alwitt .................................... 361/433
3,812,039 5/1974 Niwa .................................... 252/62.2

FOREIGN PATENT DOCUMENTS 755557 3/1967 Canada ..................................... 31/45
757002 4/1967 Canada ..................................... 31/45
2836878 8/1979 Fed. Rep. of Germany .
49-123447 11/1974 Japan .
56-51821 9/1981 Japan .

Primary Examiner—Donald A. Griffin

[57] ABSTRACT

An aluminum electrolytic capacitor capable of operation at 150 VDC or higher and 105° C. contains as its electrolyte a diisopropylamine or a triethylamine mono salt of azelaic acid dissolved in a solvent mixture of ethylene glycol, ethylene glycol and N-methylpyrrolidinone, ethylene glycol N-methylpyrrolidinone and dimethylformamide, butyrolactone, or butyrolactone and N-methylpyrrolidinone, all containing small amounts of water.

8 Claims, 2 Drawing Figures

ELECTROLYTIC CAPACITOR FOR AT LEAST 150 V SERVICE

BACKGROUND OF THE INVENTION

This invention relates to an aluminum electrolytic capacitor containing an electrolyte having as solute a mono salt of azelaic acid and diisopropylamine or triethylamine. This electrolyte permits capacitor operation at 105° C. and 150 VDC or higher.

Electrolytes for aluminum electrolytic capacitors operating at voltages of 150 V or higher most commonly contain salts of boric acid or boric acid derivatives in ethylene glycol. The maximum operating temperature for such an electrolyte system is less than 100° C. and normally 65°–85° C. This temperature limitation is caused by the rapid reaction of glycol with boric acid and other borate species to form polymeric glycolborates and water at about 100° C. The minimum operating temperature in such a system is above −20° C. as glycol freezes at −17.4° C.

It is desirable to develop electrolytic capacitors capable of operating continuously at 150 VDC or above at a temperature of 105° to 125°C. Electrolyte systems for such capacitors, described by M. Finkelstein, S. D. Ross, and F. S. Dunkl in U.S. Pat. Nos. 4,373,176, and 4,373,177, both issued Feb. 8, 1983, have been developed which utilize nonborate electrolytes because, as noted above, borates react with glycol.

It is desirable that that solute be stable at 105° C. because of the internal temperature developed during operation of capacitors at 130 VDC and above. Screening tests in sealed tubes at 105° C. and 125° C. have proved satisfactory in predicting suitable capacitor operation, particularly in checking for resistivity increase which must be less than 25%.

The major cause of resistivity increase is amide formation, particularly when the solute is an ammonium or substituted ammonium salt of a monobasic or dibasic carboxylic acid. Amide formation is easiest with ammonium salts and decreases with increasing substitution in the amine, with tertiary amines least susceptible as then amide formation requires cleavage of the carbonnitrogen bond. Another possible degradative reaction is cyclic ketone formation, particularly $C_5$ to $C_7$ ketones, but is of little consequence for acids containing more than eight carbon atoms.

The isoelectric point of aluminum oxide, i.e. the point of maximum stability and minimum solubility, is at pH of 5.5. Thus, a slightly acidic solute as provided by a mono salt of a dibasic acid is less likely to attack the aluminum oxide dielectric than is the slightly basic di-salt.

SUMMARY OF THE INVENTION

An aluminum electrolytic capacitor is provided that is capable of continuous operation at 105° to 125° C. and at least 150 VDC through the use of an electrolyte having a mono salt of azelaic acid and diisopropylamine or triethylamine as solute and as solvent ethylene glycol, ethylene glycol and N-methylpyrrolidinone, ethylene glycol and N-methylpyrrolidinone and N,N'-dimethylformamide, butyrolactone, or butyrolactone and N-methylpyrrolidinone, all containing small amounts of water.

Mono salts of azelaic acid with ammonia or primary amines were too unstable to be used at the temperature required, as were most salts with secondary amines with the notable exception of mono(di-n-propylammonium) and the mono(diisopropylammonium) salts. Even the di-n-propylammonium salt was marginal for 105° C. operation.

When low-operating temperatures are required, e.g. −40° C. and below, N,N'-dimethylformamide (DMF) is the usual solvent choice. Unfortunately, this solvent gave an electrolyte which had a large resistivity change with time at 105° C. Therefore, DMF is combined with water, ethylene glycol and N-methylpyrrolidinone (NMP) to obtain both the desired high- and low-temperature properties. When more modest low-temperature properties were desired, e.g., 50% capacity retention at −40° C. and 70% at −20° C., the solvent was water, ethylene glycol, and NMP. Butyrolactone and butyrolactone-NMP, both containing water, were solvent choices when low temperature properties which approach those obtained using DMF are required.

DESCRIPTION OF THE PREFERRED EMBODIMENTS

Figure 1:
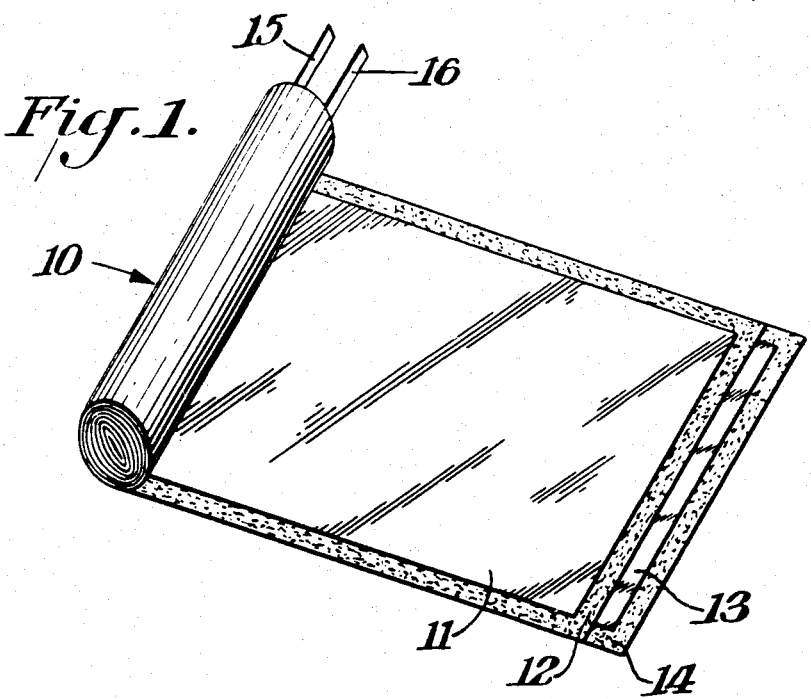
FIG. 1 shows a wound capacitor section partially unrolled.

Referring to FIG. 1, wound capacitor section 10 consists of anode foil 11 of aluminum having on its surface an insulating barrier layer oxide. Cathode foil 13 is also aluminum. Electrolyte absorbent layers 12 and 14, preferably paper, are positioned between the anode foil 11 and cathode foil 13 and interwound therewith. Tabs 15 and 16 are connected to electrodes 11 and 13, respectively, to provide for connection of these electrodes to leads. When completely wound, section 10 is impregnated with the electrolyte of this invention (not shown).

Figure 2:
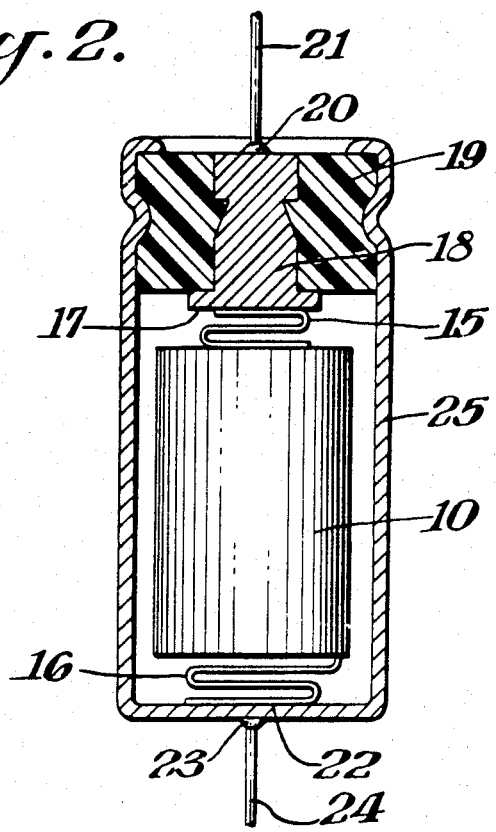
FIG. 2 is a cross-section of a capacitor containing a wound section.

FIG. 2 shows a cross-section of an axial capacitor in which the cathode tab 16 of capacitor section 10 is welded at 22 to container 25 on the inside of it and cathode lead 24 is welded to the outside of container 25 at 23. Anode tab 15 is welded to portion 17 of insert 18 positioned in bushing 19 which is welded at 20 to anode lead 21. Section 10 is impregnated with the electrolyte of this invention.

The electrolyte of this invention is a mono salt of azelaic acid and diisopropylamine or triethylamine dissolved in as solvent ethylene glycol, ethylene glycol and N-methylpyrrolidinone with and without dimethylformamide, butyrolactone, or butyrolactone and N-methylpyrrolidinone, all containing small amounts of water. It was found that Emerox 1144 azelaic acid, available from Emery Industries Inc., Cincinnati, OH, which is approximately 90% azelaic acid and 10% other dicarboxylic acids of about the same carbon number, can be used to prepare equivalent electrolytes to those made from the pure acid at less expense. The following examples show the utility of these electrolytes.

EXAMPLE 1

In this example, the utility of the azelate mono salts in a glycol-water solvent is shown. The composition of the electrolytes is in weight percent. All but electrolyte B were formulated using the Emerox 1144 mixture.

Electrolyte A:

15.3% azelaic acid, 8.2% triethylamine, 4.0% water and 72.5% glycol.

Electrolyte B:
the same as A except 68.9% glycol plus 0.1% ammonium dihydrogen phosphate and 3.5% o-nitroanisole.

Electrolyte C:
10.6% azelaic acid, 5.7% triethylamine, 4.0% water, and 79.7% glycol.

Electrolyte D:
same as C except 79.4% glycol and 0.3% ammonium dihydrogen phosphate.

Electrolyte E:
22.4% azelaic acid, 12.1% diisopropylamine, 4.5% water and 61.0% glycol.

The resistivities of the electrolytes at 25° C. were 735, 730, 860, 821, and 965 Ω-cm, respectively. Their maximum formation voltages at 25° C. were 473, 448, 458, 453 (and 440 at 85° C.), and 473 volts, respectively. Both the resistivity and formation voltage values indicate suitability for use in capacitors rated at 150 VDC or higher.

The ammonium dihydrogen phosphate may be added to prevent cathode depassivation during capacitor operation, and other electrolyte-soluble phosphates may be used for this same purpose. A nitro compound, such as the o-nitroanisole above, may be added if the presence of a depolarizer is desired.

The high-temperature stability of electrolyte A (utilizing triethylamine) and electrolyte E (utilizing diisopropylamine) were tested by heating sealed tubes containing the electrolytes at 125° C. for 1500 hrs or more and then measuring the resistivity. A change of less than 25% is satisfactory. After 1506 hrs, electrolyte A had a resistivity of 741 Ω-cm compared to an initial resistivity of 735 Ω-cm, a 0.8% change. After 1673 hrs, electrolyte E had a resistivity of 984 Ω-cm vs 965 Ω-cm initially, approximately a 2% change. This indicates that both the triethylamine and the diisopropylamine mono salts of azelaic acid are remarkably stable. This stability will be unchanged or virtually unchanged by modest changes in solute concentration or minor amounts of additives.

EXAMPLE 2

Low-temperature electrolytes were prepared using a solvent mixture of ethylene glycol, water, and N-methylpyrrolidinone (NMP) with and without N,N'-dimethylformamide (DMF). The composition of the electrolytes is in weight percent.

Electrolyte F:
9.0% azelaic acid, 4.8% triethylamine, 41.4% glycol, 41.1% NMP, and 4.1% water.

Electrolyte G:
The same solute concentration as F, and 16.5% glycol, 65.7% NMP, and 4.0% water.

Electrolyte H:
8.4% azelaic acid, 4.8% triethylamine, 12.5% glycol, 19.3% NMP, 52.9% DMF, and 2.1% water.

Electrolyte I:
8.3% azelaic acid, 4.7% triethylamine, 12.3% glycol, 38.0% NMP, 34.7% DMF, and 2.0% water.

The resistivities of the electrolytes at 25° C. were 821, 1146, 649, and 825 Ω-cm, respectively, at −40° C., 32,376; 22,460; 4,430; and 6,960 Ω-cm, respectively, and at −55° C., 191,700; 102,300; 11,500; and 19,500 Ω-cm, respectively. As expected the electrolytes containing DMF had excellent −55° C. resistivity; however, it was surprising that electrolyte I with its lesser amount of DMF had such satisfactory properties. The maximum formation voltages at 25° C. for the four electrolytes were 474, 480, 455, and 473 volts, respectively, again showing suitability for use at 150 V or higher.

The stability of the low-temperature electrolytes, F, H, and I at 105° C. was evaluated by heating in sealed tubes for at least 1500 hrs. and then measuring the resistivity. After 2010 hrs, electrolyte F had a resistivity of 877 Ω-cm, a change of 6.8%. Electrolyte H after 1606 hrs had a resistivity of 655 Ω-cm, a change of 0.9%, while after 1578 hrs electrolyte I had a resistivity of 850 Ω-cm, a change of 3.0%. All were below the 25% limit.

EXAMPLE 3

The formulations in this example contain butyrolactone with or without NMP plus water as the solvent mixture. 2-Ethylhexanol is present in formulations K and L for the purpose of improving the interaction of the electrolyte and capacitor spacer paper.

Electrolyte J:
16.4% azelaic acid, 8.9% triethylamine, 66.4% butyrolactone, and 8.3% water.

Electrolyte K:
the same as J except 4.9% 2-ethylhexanol and 61.5% butyrolactone.

Electrolyte L:
17.5% azelaic acid, 9.4% triethylamine, 51.7% butyrolactone, 9.5% water and 11.9% 2-ethylhexanol.

Electrolyte M:
the same as L except the 2-ethylhexanol was replaced by 11.9% NMP.

Electrolyte N:
13.3% azelaic acid, 7.2% triethylamine, 70.7% butyrolactone, and 8.8% water.

Electrolyte O:
the same as N except 61.9% butyrolactone and 8.8% NMP.

Electrolyte P:
12.6% azelaic acid, 6.8% triethylamine, 67.1% butyrolactone, 8.4% water, and 5.0% 1-nitropropane as depolarizer.

The resistivities of these electrolytes at 25° C. are 506, 557, 543, 540, 482, 547, and 503 Ω-cm, respectively, and their maximum formation voltages at 85° C. are 420, (K not measured), 425, 415, 420, 430, and 430 volts, respectively. In addition, low-temperature resistivities for J and K were measured and are 3640 and 4000 Ω-cm at −25° C., respectively, 9760 and 11,100 Ω-cm, at −40° C., respectively, and 48,800 and 48,200 Ω-cm at −55° C., respectively, Stability at 105° C. was measured in sealed tubes (as described above) for electrolytes L, M, N, and O. Their results were: after 1000 hrs L had a resistivity of 684 Ω-cm, a change of 25.9%, after 1264 hrs M had a resistivity of 636 Ω-cm, a change of 17.7%, after 1242 hrs N had a resistivity of 524 Ω-cm, a change of 8.7%, and after 928 hrs O had a resistivity of 599 Ω-cm, a change of 9.5%. Except for electrolyte L, all were within the 25% limit.

EXAMPLE 4

Electrolyte D in Example 1 was tested in 150 V and 250 V capacitors at 105° C. The 150 V units were subjected to a 2000 hr. life test and a 500 hr. shelf test. In the life test, capacitance changed from 99.69 μF to 97.44 μF (−2.27%), ESR changed from 0.571 ohms to 0.665 ohms (16.53%), and leakage current changed from 28 μA to 7 μA (−75%). Initial and final values for the shelf test were capacitance, 99.8 μF and 97.8 μF (2.05%), ESR, 0.57 ohms and 0.451 ohms (−23.22%), and leakage current, 40 μA and 55 μA (37.5%).

The 250 V units underwent a 1000 hr. life test and 500 hr. shelf test. In the life test, capacitance changed from 212.9 μF to 213.3 μF (−1.11%) ESR changed from 0.250 ohm to 0.243 ohm (−3.18%), and leakage current changed from 43 μA to 5.1 μA) (−88.1). In the shelf test, capacitance changed from 215.1 μF to 213.1 μF (−0.93%), ESR changed from 0.249 ohm to 0.203 ohm (−18.5%), and leakage current changed from 34 μA to 163 μA (+379.4%).

Another set of 250 VDC capacitors utilized an electrolyte containing 70.8 wt% butyrolactone and 8.8 wt% water as a solvent mixture and 13.2 wt% azelaic acid and 7.2% triethylamine as solute (electrolyte R which is almost identical with N of Example 3). This set of capacitors was subjected to shelf tests at 105° C. for 500 hrs. Initial average values were 942 μF capacitance, 3.88% dissipation factor, 54.6 mΩ equivalent series resistance, and 42 μA leakage current. Final average values were 928 μF (1.5% change), 3.31% dissipation factor (−15% change), 47.3 mΩ (−13% change), and 195 μA (364% change). There were no failures.

In addition, the above electrical parameters were tested from −55° C. to 125° C. for this set of capacitors. The table below gives the results.

TABLE

| Temp, °C. | Cap | ΔC | DF | ΔDF | ESR | ΔESR | Failures |
|---|---|---|---|---|---|---|---|
| −54 | 680 | −28 | 249 | 7200 | 4560 | 9400 | 0/6 |
| −41 | 870 | −7.8 | 79 | 2200 | 1200 | 2400 | 0/6 |
| 22 | 944 | — | 3.4 | — | 48.0 | — | 0/6 |
| 85 | 994 | 5.3 | 3.0 | −12 | 40.2 | −16 | 0/6 |
| 105 | 1010 | 7.0 | 3.0 | −11 | 39.9 | −17 | 0/6 |
| 124 | 1020 | 8.0 | 3.1 | −11 | 39.7 | −17 | 0/6 |

Thus, it can be seen that the electrolytes of the present invention provide stable capacitors capable of continuous operation at 150 VDC or above and 105 to 125° C.

What is claimed is:

1. An aluminum electrolytic capacitor comprising two contiguously wound aluminum foil electrodes with interleaved spacers, one of said foils bearing a barrier layer dielectric oxide on its surface, and an electrolyte in contact therewith, said electrolyte comprising as solute a diisopropylamine or a triethylamine mono salt of azelaic acid dissolved in a solvent mixture of water and a solvent selected from the group of ethylene glycol, ethylene glycol and N-methylpyrrolidinone, ethylene glycol and N-methylpyrrolidinone and dimethylformamide, butyrolactone, and butyrolactone and N-methylpyrrolidinone and providing a capacitor that operates at 105° to 125° C. and at least 150 V.

2. A capacitor according to claim 1 wherein said electrolyte additionally contains a nitro-compound.

3. A capacitor according to claim 1 wherein said solvent is a mixture of 4.0 to 4.5 wt% water and 61 to 79.7 wt% ethylene glycol.

4. A capacitor according to claim 3 wherein said electrolyte additionally contains a phosphate.

5. A capacitor according to claim 4 wherein said electrolyte contains 10.6 wt% azelaic acid, 5.7 wt% triethylamine, 79.4 wt% ethylene glycol, 4.0 wt% water, and 0.3 wt% phosphate.

6. A capacitor according to claim 1 wherein said solvent is a mixture of 2.0 to 4.1 wt% water, 12.3 to 41.1 wt% ethylene glycol, 19.3 to 65.7 wt% N-methylpyrrolidinone and 0 to 52.9 wt% dimethylformamide and said solute contains 4.7 to 4.8 wt% triethylamine and 8.3 to 9.0 wt% azelaic acid.

7. A capacitor according to claim 1, wherein said solvent is a mixture of 8.2 to 9.5 wt% water, 51.7 to 70.8 wt% butyrolactone, and 0 to 11.9 wt% N-methylpyrrolidinone, said solute contains 12.6 to 17.5 wt% azelaic acid and 6.8 to 9.4 wt% triethylamine, and there is present 0 to 11.9 wt% 2-ethylhexanol and 0 to 5 wt% 1-nitropropane.

8. A capacitor according to claim 1 wherein said solvent is a mixture of 4.3 to 4.5 wt% water and 61.0 to 73.7 wt% ethylene glycol, said solute contains 11.3 to 22.4 wt% azelaic acid and 6.8 to 12.1 wt% diisopropylamine, and there is present 0 to 3.5 wt% nitro compound and 0 to 1.0 wt% phosphate.

* * * * *